July 29, 1941.　　　　F. W. SEYBOLD　　　　2,251,170
AUTOMATIC TRANSMISSION
Filed July 20, 1939　　　　4 Sheets-Sheet 1

FREDERICK W. SEYBOLD.
INVENTOR.

BY John F. Marden
AGENT.

FREDERICK W. SEYBOLD
INVENTOR.

July 29, 1941.  F. W. SEYBOLD  2,251,170
AUTOMATIC TRANSMISSION
Filed July 20, 1939  4 Sheets-Sheet 3
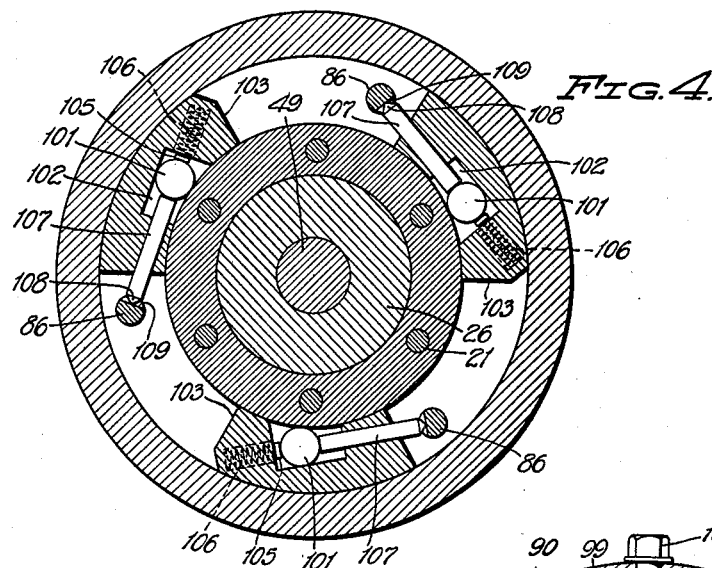
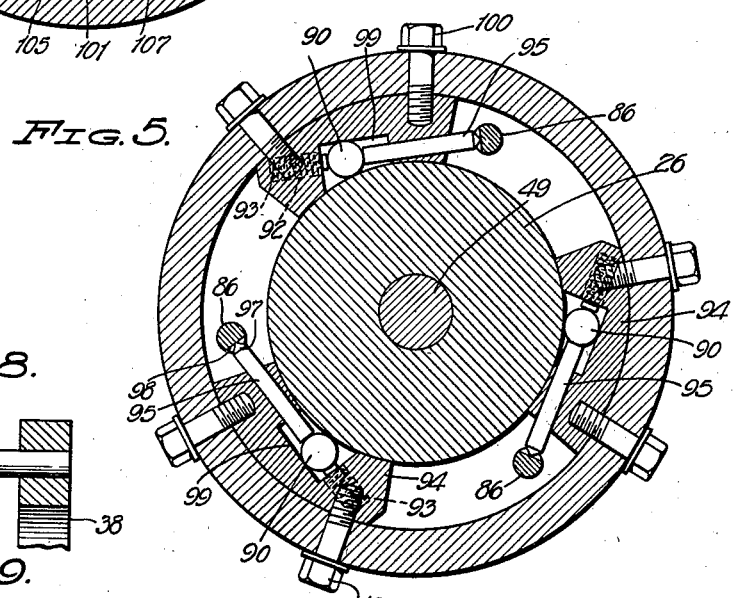
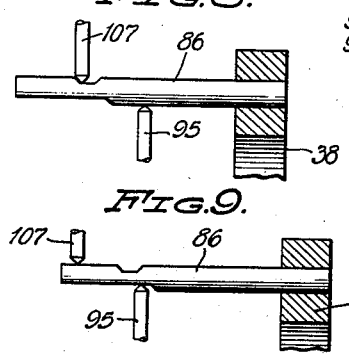
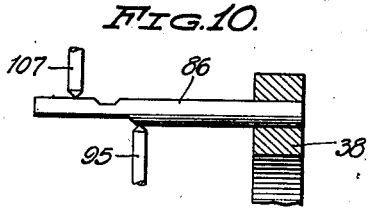
FREDERICK W. SEYBOLD.
INVENTOR.
BY
John F. Marder
AGENT.

July 29, 1941.  F. W. SEYBOLD  2,251,170
AUTOMATIC TRANSMISSION
Filed July 20, 1939  4 Sheets-Sheet 4
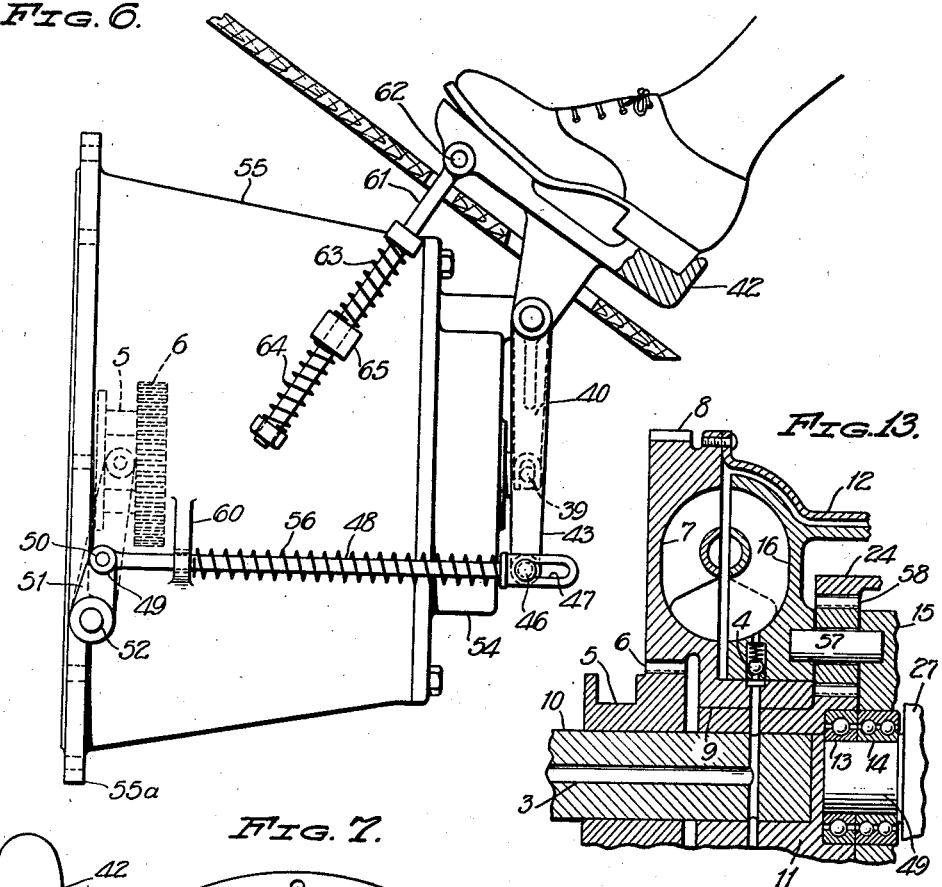
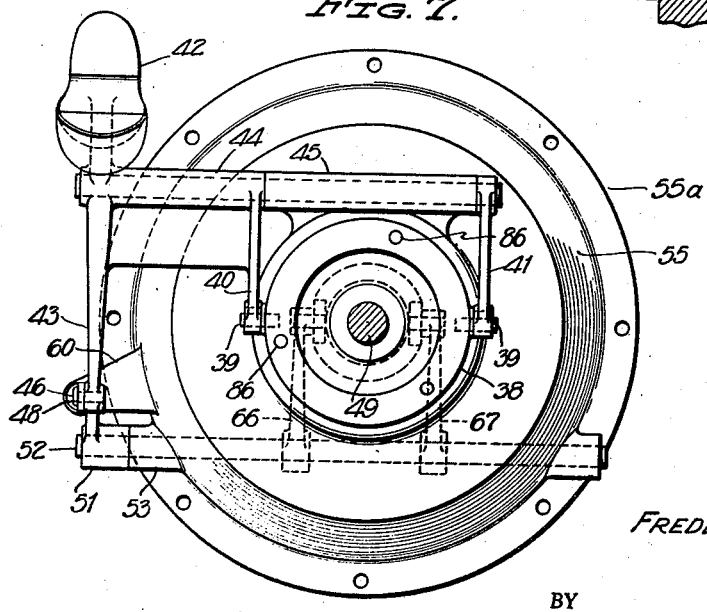
FREDERICK W. SEYBOLD.
INVENTOR.
BY
John F. Marden
AGENT.

Patented July 29, 1941

2,251,170

UNITED STATES PATENT OFFICE 2,251,170

AUTOMATIC TRANSMISSION

Frederick W. Seybold, Westfield, N. J.

Application July 20, 1939, Serial No. 285,560

9 Claims. (Cl. 74—189.5)

This invention relates to variable speed transmissions or torque converters, and more particularly to the type of mechanism for varying the speed and torque ratio between the driving and driven members in power transmissions for motor vehicles or the like.

It is a primary object of this invention to provide a power transmission by which a low torque at high input shaft speed may be converted into high torque at low output shaft speed.

Another important object of this invention is to provide a power transmission mechanism in which the transition from low gear ratio to high gear ratio is accomplished without attention thereto or manipulation thereof on the part of the operator.

A further object of this invention is to provide a mechanism in which the output shaft may be stationary during rotation of the input shaft, and in which the output shaft may be made to rotate in a reverse direction from the direction of the input shaft without the use of an auxiliary gear set.

Another object of this invention is to provide a power transmission in which the conventional gear shift lever is entirely eliminated and in which the speed variation and reversal of direction is completely controlled by the movement of a single foot pedal, wherein forward, reverse, and neutral positions are at the disposal of the operator.

It is a further object of this invention to provide a power transmission unit in which the use of an ordinary friction type clutch is eliminated, in which clutching action is accomplished through the well known Föttinger fluid coupling, and in which the loss of fluid through leakage from the fluid coupling and gear case is constantly supplied to the unit by the lubrication system of the engine or other source of fluid supply.

A still further object of this invention is to provide a power transmission unit in which wear and strain on the gear train are reduced and in which flexibility and smooth action are attained by the employment of planetary gearing in tandem providing an infinite number of gear ratios, together with a fluid coupling to bring about direct drive after the vehicle or the like has attained sufficient speed.

With these and other objects in mind which will be apparent throughout the description, the invention resides in the novel construction, combination, and arrangement of parts substantially as hereinafter described and more particularly defined in the appended claims, it being understood that such changes in the precise embodiment of the invention may be made as come within the scope of the claims.

The accompanying drawings illustrate an example of the physical embodiment of the invention constructed according to the best mode so far devised for the practical application of the principles thereof, and in which:

Figure 4 is a sectional view taken along the line 4—4 of Figure 1;

Figure 5 is a similar view taken along the line 5—5 of Figure 1;

Figure 6 is a side elevational view of the transmission unit showing the foot pedal control means;

Figure 7 is a rear elevational view of the structure shown in Figure 6;

Figure 8 is a fragmentary diagrammatic view illustrating the position of the brake control rods when the parts of the unit are in reverse operation;

Figure 9 is a similar view but with the parts in position for low gear operation;

Figure 10 is a similar view but with the parts in neutral operating position;

Figure 11 is a fragmentary detail view of the structure shown in Figures 4 and 5, illustrative of means for eliminating wear on the locking brake rollers, and showing a roller in engagement with the roller brake locking disc;

Figure 12 is a view similar to Figure 11 but showing the roller withdrawn from engagement with the roller brake locking disc; and Figure 13 shows the fluid replacement channels and valves.

Figure 1:
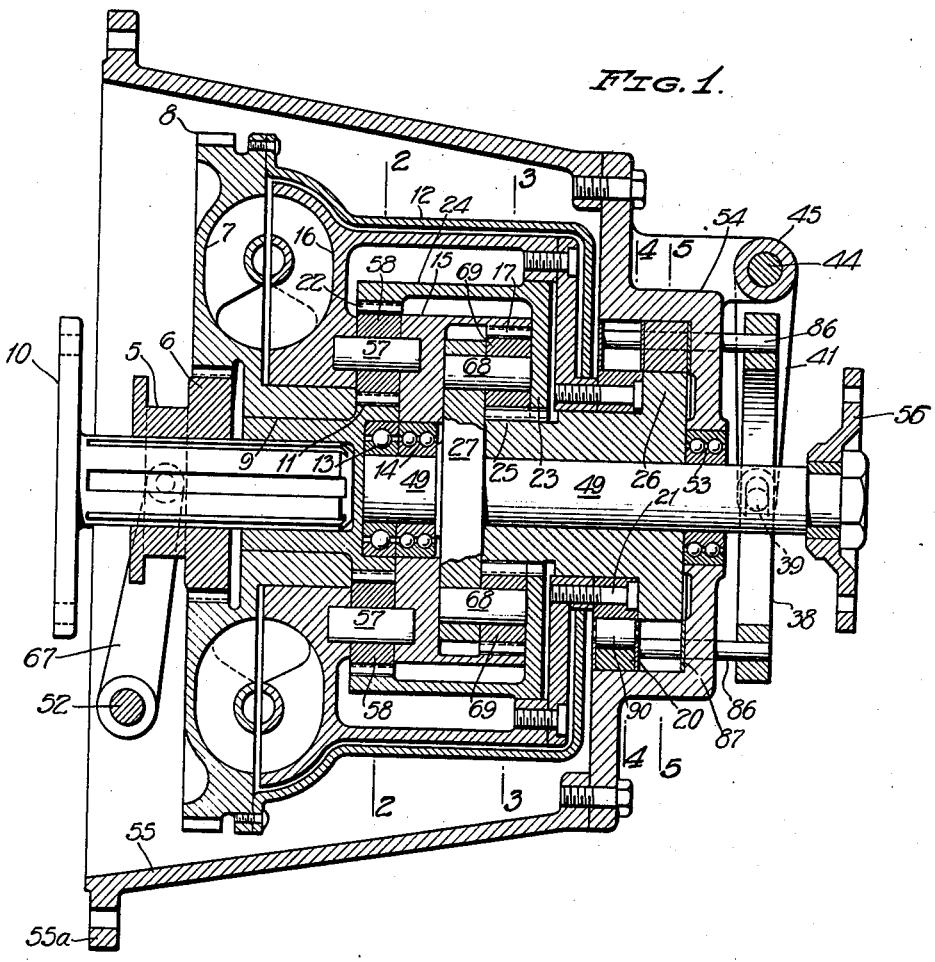
Figure 1 is a side elevational view in vertical longitudinal section, through the power transmission unit.
Figure 2:
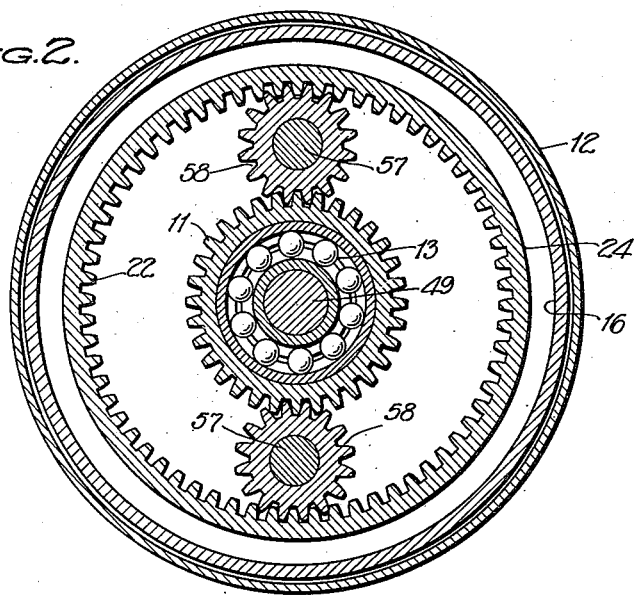
Figure 2 is a transverse sectional view taken along line 2—2 of Figure 1.
Figure 3:
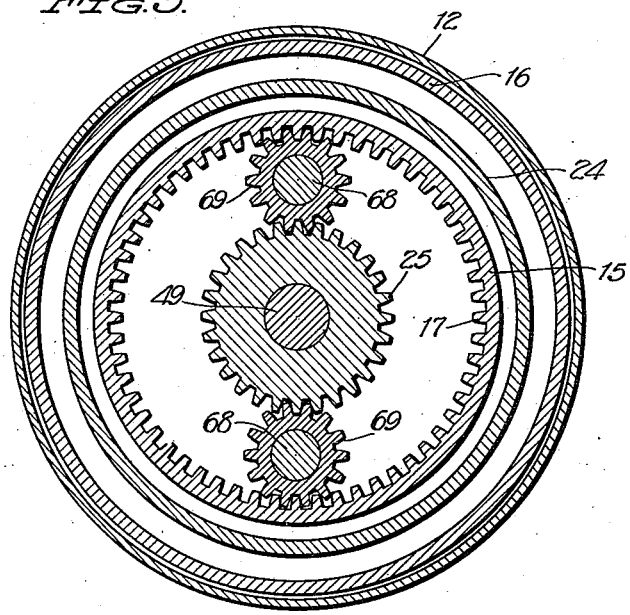
Figure 3 is a similar view taken along the line 3—3 of Figure 1.

Referring to the drawings in detail, and in particular to Figure 1, the transmission unit comprises six assemblies to be hereinafter described:

1. The driving assembly—

The driving assembly comprises the flanged spline shaft 10 which is provided with bolt holes for fastening to the crankshaft of the engine or other power supply means. Pinion 11 is splined to fit over shaft 10. Shaft 10 is provided with an axial bore 3, Figure 13, for the passage of fluid from the force feed lubrication system of the engine or any other desired pressure fluid supply.

Radial bores extend outwardly from the axial bore 3, balls 4 and springs are provided for the prevention of the return flow of the fluid from the transmission into the bore 3. Adjacent the pinion 11, and also splined on the shaft 10, is the internal tooth clutch 5 adapted to cooperate with the internal teeth 6 of the impeller 7. The latter is provided with gear teeth 8 with which the engine starting gear coacts. The impeller 7 turns freely on the hub 9 of the pinion 11 and with the shell 12 forms a closed container for the fluid of the Föttinger coupling and the planetary gearing. Pinion 11 is provided with a recess adapted to support the ball bearing 13. The left end of the driven shaft 49 is journalled in the inner raceway of the ball bearing 13. Mounted on shaft 49 adjacent to ball bearing 13 is a second ball bearing 14, upon which is rotatably supported the spider 15 of the planetary gear system of the secondary floating assembly, to be now described in detail.

2. The secondary floating assembly—

The secondary floating assembly comprises the spider 15 having one end of stub shafts 57 mounted thereon. The runner 16 supports the other end of shafts 57 on which the planet pinions 58 revolve between the supports. The spider 15 is provided with a rightwardly extending flange having an internal gear 17 formed therein. Runner 16 extends to the right, providing a seat for the flange extension 18 which is bolted to the runner 16 by the screws 19. A hardened roller brake locking disc 20 is secured to the flange extension 18 by the screws 21. Runner 16 is free to turn on the hub of the impeller 7.

3. The primary floating assembly—

The primary floating assembly comprises the deep double internal gear 24 which has the teeth 22 meshing with the pinions 57 and the internal gear teeth 23 forming a clutch drive for the sun pinion 25 which is made integral with the brake locking disc 26.

4. The driven assembly—

The driven assembly comprises the spider 27 formed integrally with the driven shaft 49, having fixed thereto the pins 68 upon which are mounted for free rotation the pinions 69 which mesh with the teeth 17 of the secondary floating assembly and the teeth 25 of the primary assembly. The driven shaft 49 has the left or forward end extension thereof journalled in the ball bearing 13, as before described, and the right or rear end portion thereof is supported by the ball bearing 53, which is in turn supported in the housing cap 54. The right or rear end portion of the driven shaft 49 has splined thereon the flange member 56 which is adapted to be suitably connected to the propeller shaft of the motor vehicle. The housing cap 54 is rigidly mounted by means of stud bolts to the transmission casing which itself is rigidly connected to the engine, and which serves as an extension of the crankcase thereof as well as a housing for the transmission unit.

5. The control assembly—

The control assembly of the transmission unit comprises a pair of roller locking brakes together with a suitable foot pedal and connections.

The roller brake locking disc 26 of the primary floating assembly (Figures 1 and 5) is mounted for free rotation on the driven shaft 49. The roller brake locking disc 26 is adapted to be engaged by the brake rollers 90 which are provided at each end with trunnions 89 which project into pear-shaped slots 88 (Figures 11 and 12) of the roller retaining plates 87.

These slots are of such shape as to guide the rollers 90 away from the roller brake disc 26 when releasing pins 95 urge the rollers 90 in a direction opposing the compression springs 92.

The rollers 90 are supported in cut-away portions 99 in the stationary brake members 94 which are secured to the stationary housing cap 54 by means of bolts 100.

The releasing pins 95 and the springs 92 are mounted in substantially coaxial bores in opposite sides of the cut-away portion 99 in the stationary brake members 94. The springs 92 constantly urge the rollers 90 toward engagement with the brake locking disc 26 because of the inclination of the outer wall of the cut-away portion 99. The releasing pins 95 are adapted to be moved axially with respect to the stationary brake members 94 by engagement of surfaces of the slidable control rods 86 with the pointed ends thereof. The control rods 86 have notches suitably disposed thereon whereby, when the notches are engaged by the pointed ends 97 of the releasing pins 95, the springs 92 will be permitted to urge the rollers 90 into wedging engagement between the stationary brake members 94 and the brake locking disc 26.

The trunnions 89, in the engaged position of the rollers 90, are permitted to have substantial movement by the enlargements provided in the slots 88. In the disengaged positions, the trunnions 89 are guided by the narrow portions of the slots 86, whereby accidental engagement of the rollers 90 with the brake locking disc 26 is effectively prevented (see Figures 11 and 12).

This arrangement prevents the wearing of flats upon the peripheral surfaces of the rollers 90. With reference to Figure 5, the direction of rotation of the driving shaft 10 would be counterclockwise, as seen in that figure. By means of the stationary brake members 94 and the rollers 90, when the releasing pins are in releasing position and their pointed ends 97 engaged in slots in the control rods 86, counterclockwise rotation of the brake locking disc 26 is permitted, while clockwise rotation thereof will cause the rollers 90 to be engaged between the inclined cut-away portion 99 and the brake locking disc 26, to effectively lock the disc 26 to the stationary brake members 94. The stationary brake members 94, rigidly secured to the stationary housing cap 54, effectively prevents clockwise rotation of the brake locking disc 26.

Referring to Figure 4, it will be seen that stationary brake members 103, similar to the stationary brake members 94, have been provided in alignment with the locking brake disc 20. These stationary brake members 103 are provided with cut-away portions 102, similar to the cut-away portions 99 of the stationary brake members 94. These cut-away portions are, however, oppositely directed. In these cut-away portions 102, rollers 101, similar to the rollers 90, are disposed and urged in one direction by the plungers 107, similar to the plungers 95, and having their pointed ends 108 adapted to engage surfaces of the same control rods 86 as engage the pointed ends of the releasing pins 95.

Springs 106, similar to the springs 92, are mounted coaxially with respect to the pins 107 in the same manner in which the springs 92 are mounted with respect to the pins 95. The rollers 101 are provided with suitable trunnions, similar to the trunnions 89, which are mounted in the same manner as the trunnions 89 and for the same purpose. Due to the reversed position of the stationary brake members 103, clockwise rotation of the locking disc 20 is permitted, while counter-clockwise rotation thereof is prevented when the releasing pins 107 are in released position, having their pointed ends disposed in a suitable slot in the respective control rods 86.

The control rods 86 are anchored in the ring 38 which is provided with radial pins 39 which cooperate with the forked levers 40 and 41. The lever 40 extends to the left into the foot pedal 42 and the lever 43. Both levers 40 and 41 are secured to the shaft 44 journalled in the bearing 45 of the housing cap 54. The lower end of lever 43 has a pin 46 which fits into the slot 47 of the spring rod 48. The latter has the eye 49 pivoted on the pin 50 of the lever 51 which is secured to the rockshaft 52 journalled in the bearing 53 of the transmission case 55. Levers 66 and 67 are also fast to the shaft 52. The spring 56 on the spring rod 48 reacts against the lug 60 on the transmission case 55 and against the slotted end of the spring rod 48 urging the lever 43 to the right. The foot pedal 42 has pivoted on its upper end the spring rod 61 on the pin 62. The two springs 63 and 64 reacting from the lug 65 on the transmission casing 55 balance the foot pedal 42 so as to place the transmission into neutral whenever foot pressure in either direction is released.

Whenever pressure is applied to the pedal 42 with the heel the spring 48 is compressed and the lever 51 is turned to the left and thereby the two levers 66 and 67 on which are pivoted the clutch shoes 68 riding in the groove of the clutch 5 move the latter out of engagement with the impeller 7.

6. The transmission case—

The transmission case (Figures 1, 6 and 7) comprises an annular casting 55 provided at its forward end with a flanged portion 55a adapted to be bolted to the driving motor. As shown, the rear end portion of the annular casting 55 is reduced and has the housing cap 54 rigidly secured thereto by means of cap or stud bolts. Other suitable constructions may, of course, be utilized.

The operation of this transmission is as follows:

To cause the transmission unit of my invention to operate in the idling or neutral position, whereby power from the flanged spline shaft 10 will not be transmitted to the output shaft 49, it will be assumed that wheel brakes are applied whereby to lock the axles and drive shaft of the motor vehicle and also that the operator's foot is removed from the pedal 42. The engine is started in the usual manner, whereupon the driving shaft 10, the pinion 11 and the impeller 7 rotate in a counterclockwise direction as viewed from the operator's seat and as seen in Figures 2, 3, 4 and 5.

The planetary spider 27 is locked in a fixed position because of its direct connection with the locked axles of the vehicle through the driven shaft 49 with which it is integral. The secondary floating assembly consisting of the planetary spider 15, the planetary pinions 58, internal gear 17, runner 16, and locking disc 20 then rotate in a counterclockwise direction.

The rate of rotation may, for an appropriate given ratio of numbers of teeth be one-seventh of the engine speed. Meanwhile, the primary floating assembly consisting of the internal gear 24, sun pinion 23, and brake locking disc 26, rotates at twice the speed of the secondary floating assembly above described, but in opposite or clockwise direction, at two-sevenths of the engine speed. Consequently, this results in the speed of the driven assembly becoming zero. Therefore, no driving power is delivered to the wheels of the car.

It will, of course, be assumed that the brake releasing pins 95 and 107 are in the position illustrated diagrammatically in Figure 10. In this position of the pins 95 and 107, the rollers 90 are in inoperative position with respect to the brake locking disc 26. The rollers 101 are in inoperative position with respect to the locking brake disc 20. The brake locking discs 20 and 26 are freely rotatable with respect to the transmission casing.

As long as the car is in neutral position the impeller 7 cannot accelerate the runner 16 through the fluid and the engine can be raced for warming up, and the car will begin to move only after the wheel brakes have been released and the pedal has been depressed in either direction.

To set the car in motion in low gear, the wheel brakes of the car are released in the ordinary manner, thereby freeing the axles and drive shaft of the motor vehicle and hence freeing the output shaft 49. The output shaft 49 begins to rotate as soon as the foot pedal 42 is depressed by the toes or downwardly forward, thereby locking the disc 26, Figures 5 and 9, against clockwise rotation, and holding the driving reaction against the primary floating assembly produced by the rotation of the pinion 11 and the intermediate mechanism.

This tendency to rotate clockwise is prevented by the roller brake locking disc 26, the rollers 90 which have been released by the action of the releasing pins 95 moving into the depression of the control rods 86, whereby this brake is in full operation.

It will be recalled that under these conditions, the brake disc 26 can rotate only in a counterclockwise direction. Therefore, it is locked firmly to the transmission casing by the clockwise driving reaction against the primary floating assembly.

The drive from the shaft 10 or engine shaft to the driven shaft 49, which is connected to the axles of the motor vehicle is now through gears only and the power loss is extremely small. The secondary floating assembly including the planetary spider 15 with the planetary pinions 58, internal gear 17, runner 16, and brake locking disc 20 now rotates at one-third engine speed in the same direction as the driving pinion 11. This direction is counterclockwise.

Since the primary floating assembly including internal gear 24, sun pinion 25 and brake locking disc 26, is locked in a stationary manner just described, the planetary spider 27, through the engagement of the teeth of the pinions 69 with the internal gear 17 and the sun pinion 25, drives this spider 27 two-thirds of its speed and in the same direction. Thus, the planetary spider 27 is now rotating at two-ninths of the speed of the engine drive shaft 10 and in the same or counterclockwise direction.

The torque of the driven shaft, including the planetary spider 27 and pinions 69, is now, therefore, four and one-half times as great as the torque of the crankshaft.

As the speed of the car increases the circulating oil in the hydraulic coupling will acquire kinetic energy which will tend to increase the speed of the runner 16 and bring its speed nearly up to that of the impeller 7, consequently the primary assembly will commence to rotate in the same direction as that of the driver and the secondary floating assembly and with continued increase in engine speed all the assemblies will rotate in the same direction as the driver and practically the same speed.

When this condition has been attained it will be no longer necessary for the operator to keep the foot pedal 42 depressed.

Should the torque requirement increase to such an extent that the primary assembly would tend to slow down, as when climbing a hill, the operator would then again depress the pedal 42 so that the brake roller lock disc 26 can come into action to absorb the torque reaction in the clockwise direction.

To place the transmission unit in reverse and cause the car to move rearwardly, the pedal 42 is depressed with the heel or downward in the rear. This motion will place the rods 86 in the position as shown in Figure 8, the brake rollers 101 come into action and prevent counterclockwise rotation of the secondary assembly. The lever 43 pushes on the lever 49 through the spring rod 48 and, through intermediate connections 66, 67 and 68, disconnects the impeller 7 from the drive shaft 10 to prevent heating if the transmission is being operated in reverse for any length of time. The brake rollers 90 have been disengaged by the release pins 95 to permit clockwise rotation of the primary assembly and consequently the drive assembly in the same direction at one-sixth engine speed.

Roller brake operation—

From the above description, it will be seen that the roller brakes can each prevent rotation in one direction only when they are in operating position, as when the releasing pins 95 do not oppose the wedging action of roller 90, clockwise rotation of the disc 26 is prevented. Likewise, when releasing pins 107 do not oppose the wedging action of rollers 101, rotation of disc 20 in counterclockwise direction is prevented. Counterclockwise rotation of disc 26, whether rollers 90 are wedged or free, is possible. Likewise, clockwise rotation of disc 20 is possible whether rollers 101 are wedged or free.

Summing up the various positions of the locking brakes, the operation will be as follows:

For neutral operation both of the brake locking discs 20 and 26 will be released, as shown diagrammatically in Figure 10.

For low speed locking disc 26 will be locked and locking disc 20 will be free, as shown diagrammatically in Figure 9.

For high speed foot pedal can be permitted to return to neutral position and the brake locking disc setting will be as for neutral operation.

For reverse operation locking disc 26 will be unlocked and 20 locked, as illustrated diagrammatically in Fig. 8.

It is, of course, understood that the above mentioned speed ratios are merely illustrative and depend only upon the number of gear teeth in the respective gear elements of the transmission unit. It will likewise be understood that the description and drawings are merely illustrative in this respect and that it is comprehended that the ratios may be widely varied without departing from the principles of my invention. It is furthermore to be understood that either one or both of the spur type planetary gear trains may, when desired, be replaced by bevel gears; and also that the transmission unit of my invention can be operated with a clutch of the conventional type interposed between the engine crankshaft and the fluid coupling of the transmission unit, when found desirable.

Having thus described the invention, what is claimed as new and desired to be secured by Letters Patent is:

1. In a transmission unit, a drive shaft having pinion means thereon, an impeller arranged for axial rotation with respect to the drive shaft, slidable means for connecting and disconnecting the drive shaft and impeller, a driven shaft coaxial with said drive shaft and having a driven assembly rotatable therewith, a primary floating assembly having planetary connection with said driven assembly, a secondary floating assembly having planetary connections with said primary floating assembly, said driven assembly and said drive shaft pinion means, and hydraulic connection with said impeller, and means operable to lock one of said floating assemblies against rotation in one direction or the other floating assembly against rotation in the opposite direction to cause low ratio rotation of said driven shaft in one or the other direction.

2. In a transmission unit, a drive shaft having pinion means and sliding clutch means thereon, an impeller having clutch means adapted to be engaged with said first clutch means for high ratio connection, a driven shaft coaxial with said drive shaft and having a driven assembly rotatable therewith, a primary assembly having a planetary connection with said driven assembly, a secondary floating assembly having planetary connections with said primary floating assembly, said driven assembly and said drive shaft pinion means, and hydraulic connection with said impeller, and means operable to lock one of said floating assemblies against rotation in one direction or the other floating assembly against rotation in the opposite direction to cause low ratio rotation of said driven shaft in one or the other direction.

3. In an automatic transmission unit, a drive shaft having pinion means and sliding clutch means thereon, an impeller having clutch means adapted to be engaged with said first clutch means for high ratio connection, a driven shaft having a driven assembly rotatable therewith, a primary floating assembly having a planetary connection with said driven assembly, a secondary floating assembly having planetary connections with said primary floating assembly, said driven assembly, and said drive shaft pinion means, and hydraulic connection with said impeller, and manually operable means to lock either of said floating assemblies against rotation in the opposite direction to cause low ratio rotation of said driven shaft, or to release both said floating assemblies for rotation of said drive shaft, and floating assemblies without rotation of said driven shaft.

4. In a power transmission unit, coaxial drive and driven shafts, and means providing gear connections therebetween comprising a floating assembly having planetary connection with said drive shaft and said driven shaft, a Föttinger fluid coupling connecting said drive shaft and said floating assembly sliding engaging means on said drive shaft to connect or disconnect the drive shaft and one element of said fluid coupling, and a second floating assembly having planetary connection with said driven shaft and with said first floating assembly.

5. In a power transmission unit, coaxial drive and driven shafts, means providing gear connection therebetween comprising a floating assembly having planetary connection with said drive shaft and said driven shaft, a Föttinger fluid coupling connecting said drive shaft and said floating assembly sliding engaging means on said drive shaft to connect or disconnect the drive shaft and one element of said fluid coupling, and a second floating assembly having planetary connection with said driven shaft and with said first floating assembly, said fluid coupling tending to accelerate said floating assembly and said driven shaft with an increase in speed of the drive shaft.

6. In a power transmission unit, a power input member, a floating assembly having planetary connection therewith, a power output member coaxial with said power input member, a second floating assembly having planetary connection with said power output member and with said first assembly, locking roller brake means operatively connected to said second floating assembly, and a Föttinger fluid coupling connecting said input member and said floating assembly whereby to vary the speed ratio between said power input and power output members, and means slidable with respect to said power input member for engaging or disengaging the input member and one element of said fluid coupling.

7. In a power transmission unit, a power input member, a floating assembly having planetary connection therewith, a power output member coaxial with said power input member, a second floating assembly having planetary connection with said power output member and with said first assembly, locking roller brake means operatively connected to said second floating assembly and a Föttinger fluid coupling connecting said power input member with said floating assembly adapted automatically to vary the speed ratio provided by the gear connection between said power input and power output members, and means slidable with respect to said power input member for engaging or disengaging the input member and one element of said fluid coupling.

8. In a power transmission unit, a drive shaft having pinion means thereon, an impeller arranged for axial rotation with respect to the drive shaft, slidable means for connecting or disconnecting the drive shaft and impeller, a driven shaft coaxial with said drive shaft and having a driven assembly rotatable therewith, a primary floating assembly having planetary connections with said driven assembly; a secondary floating assembly having planetary connections with said primary floating assembly, said driven assembly, and said drive shaft pinion means and hydraulic connection with the impeller of said drive shaft, and means operable to lock said secondary floating assembly against rotation in one direction and to disconnect said impeller from the drive shaft means while the transmission unit is operating in reverse.

9. In a power transmission unit comprising four element interconnected planetary gearing, a first element consisting of an hydraulic impeller and a sun gear, two intermediate elements each having one-way brake devices effective in opposite directions, and a fourth element comprising a spider and planet pinions, one of said intermediate elements being equipped with an hydraulic runner coacting with the impeller of the first element, thereby making said first intermediate element capable of overcoming the torque reaction of the second intermediate element, and manual means for releasing both one-way brakes separately or simultaneously.

FREDERICK W. SEYBOLD.